United States Patent
Sun

(10) Patent No.: US 8,797,841 B2
(45) Date of Patent: Aug. 5, 2014

(54) METHOD, SYSTEM AND DEVICE FOR RECOVERING SERVICE

(75) Inventor: Jun Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 845 days.

(21) Appl. No.: 13/016,708

(22) Filed: Jan. 28, 2011

(65) Prior Publication Data

US 2011/0128844 A1 Jun. 2, 2011

Related U.S. Application Data

(63) Continuation of application No. PCT/CN2009/071802, filed on May 14, 2009.

(30) Foreign Application Priority Data

Aug. 7, 2008 (CN) .......................... 2008 1 0146069

(51) Int. Cl.
*G01R 31/08* (2006.01)

(52) U.S. Cl.
USPC ............................................. 370/217

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 7,974,183 | B2 * | 7/2011 | Li et al. ..................... 370/217 |
| 2004/0190445 | A1 * | 9/2004 | Dziong et al. ............... 370/225 |
| 2004/0193724 | A1 * | 9/2004 | Dziong et al. ............... 709/232 |
| 2004/0193728 | A1 * | 9/2004 | Doshi et al. ................. 709/238 |
| 2004/0205237 | A1 * | 10/2004 | Doshi et al. ................. 709/241 |
| 2004/0205238 | A1 * | 10/2004 | Doshi et al. ................. 709/241 |

(Continued)

FOREIGN PATENT DOCUMENTS

| CN | 1556637 A | 12/2004 |
| CN | 1661984 A | 8/2005 |

(Continued)

OTHER PUBLICATIONS

International Search Report issued Aug. 20, 2009 in connection with International Patent Application No. PCT/CN2009/071802.

(Continued)

*Primary Examiner* — Jung-Jen Liu

(57) ABSTRACT

A method, system and device for recovering services are provided, which relate to the field of communication. The method includes the following steps. Working resources of a Traffic Engineering (TE) link in a network are set to a shared MESH recovery state, and information of the shared MESH recovery state is flooded into the network, in which the information of the shared MESH recovery state is used to broadcast that the failure recovery mode of the working resources of the TE link is a band-level shared MESH recovery mode; whether the TE link fails is detected; and when detecting that the TE link fails, services on the working resources of the TE link are recovered by switching the N band-level FA LSPs on the TE link to the corresponding N band-level shared MESH recovery paths. The technical solutions reduce service recovery time and satisfy service requirements of customers while increasing bandwidth resource usage rate.

8 Claims, 2 Drawing Sheets

(56) References Cited

U.S. PATENT DOCUMENTS

| | | | |
|---|---|---|---|
| 2004/0205239 A1* | 10/2004 | Doshi et al. | 709/241 |
| 2004/0246896 A1* | 12/2004 | Hoang et al. | 370/230 |
| 2004/0246912 A1* | 12/2004 | Hoang et al. | 370/254 |
| 2004/0246973 A1* | 12/2004 | Hoang et al. | 370/395.21 |
| 2004/0247317 A1* | 12/2004 | Sadananda | 398/57 |
| 2004/0258409 A1* | 12/2004 | Sadananda | 398/50 |
| 2006/0045007 A1* | 3/2006 | Huck | 370/226 |
| 2008/0117806 A1 | 5/2008 | Xu | |
| 2008/0124077 A1* | 5/2008 | Su et al. | 398/48 |
| 2008/0124080 A1* | 5/2008 | Rabbat et al. | 398/59 |
| 2009/0135815 A1* | 5/2009 | Pacella | 370/389 |
| 2010/0091647 A1* | 4/2010 | Li et al. | 370/225 |

FOREIGN PATENT DOCUMENTS

| | | |
|---|---|---|
| CN | 1694418 A | 11/2005 |
| CN | 101155064 A | 4/2008 |
| EP | 1 473 887 A2 | 11/2004 |
| EP | 2 056 526 A1 | 5/2009 |
| WO | WO 2008/040253 A1 | 4/2008 |

OTHER PUBLICATIONS

Written Opinion of the International Searching Authority dated Aug. 20, 2009 in connection with International Patent Application No. PCT/CN2009/071802.

Supplementary European Search Report dated Jul. 1, 2011 in connection with European Patent Application No. 09 80 4461.

Hyuncheol Kim, et al., "A New Recovery Scheme with Reverse Shared Risk Link Group in GMPLS-Based WDM Networks", Apr. 23, 2004, p. 1078-1087.

S. Seetharaman, et al., "IP over Optical Networks: A Summary of Issues", Apr. 2001, 53 pages.

J.P. Lang, et al., "RSVP-TE Extensions in Support of End-to-End Generalized Multi-Protocol Label Switching (GMPLS) Recovery", May 2007, 47 pages.

Partial Translation of Office Action dated Oct. 31, 2012 in connection with Chinese Patent Application No. 200810146069.X.

* cited by examiner

METHOD, SYSTEM AND DEVICE FOR RECOVERING SERVICE

CROSS-REFERENCE TO RELATED APPLICATIONS

This application is a continuation of International Application No. PCT/CN2009/071802, filed on May 14, 2009, which claims priority to Chinese Patent Application No. 200810146069.X, filed on Aug. 7, 2008, both of which are hereby incorporated by reference in their entireties.

TECHNICAL FIELD

The present invention relates to the field of communication, and more particularly to a method, system and device for recovering a service.

BACKGROUND

By introducing a control plane between a transport plane and a management plane of a conventional optical network, an Automatically Switched Optical Network (ASON) has automatic neighbor, automatic link and automatic topology discovery functions, combines a rerouting mechanism for the control plane with protection mechanisms such as subnetwork connection protection and multiplex section protection of the conventional optical network, and can flexibly and automatically provide various protection and restoration services, such as permanent 1+1 protection, 1+1 protection plus restoration, multiplex section protection plus restoration, shared MESH restoration, dynamic restoration, no protection, and extra service.

To effectively recover a service when a failure occurs, the prior art provides the following technical solutions:

A first technical solution: ring network protection technologies such as multiplex section protection in a Synchronous Digital Hierarchy (SDH) network or shared protection ring in an Optical Transport Networks (OTN) network are adopted to protect multiple services simultaneously interrupted by network failures, and service protection switching time can be controlled within 50 ms. However, a drawback of the solution is in that, bandwidth resource usage rate of the network is low, and network topology planning is complex.

A second technical solution: a shared MESH recovery solution is adopted. The solution can share recovery resources, and increase the resource usage rate. However, a drawback of the solution is in that, when a link fails, the affected services individually and independently initiate rerouting signaling, and the process for signaling transmission and processing occupies the communication bandwidth and processing time of a system, so that recovery time delay occurs, and service requirements of customers cannot be satisfied.

During the development of the present invention, the inventor finds that the prior art at least has the following problems:

Although the recovery time of a service adopting the conventional multiplex section protection mechanism is short, the average resource usage rate is low and network planning is complex. Although a method adopting the shared MESH recovery mechanism can increase the resource usage rate, the service recovery time of the method is longer than that of the conventional multiplex section protection mechanism, and the service requirements of customers cannot be satisfied.

SUMMARY

Accordingly, the embodiments of the present invention provide a method, system and device for recovering a service, so as to increase resource usage rate and reduce service recovery time. The technical solutions are as follows.

In an aspect, in an embodiment, the present invention provides a method for recovering a service. The method includes the following steps:

Working resources that reside on a Traffic Engineering (TE) link in a network are set to a shared MESH recovery state, and information of the shared MESH recovery state is flooded into the network, in which the information of the shared. MESH recovery state is used to broadcast that the failure recovery mode of the working resources of the TE link is a band-level shared MESH recovery mode, N band-level Forward Adjacency Label Switched Paths (FA LSPs) are established on the working resources of the TE link, and N band-level shared MESH recovery paths corresponding to the N band-level FA LSPs are established on recovery resources of other TE links aside from the TE link where the working resources reside in the network.

Whether the TE link where the working resources reside fails is detected, and when it is detected that the TE link where the working resources reside fails, a service on the working resources of the TE link is recovered by switching the N band-level FA LSPs on the TE link to the corresponding N band-level shared MESH recovery paths.

In another aspect, in an embodiment, the present invention provides a node apparatus. The apparatus includes a setting module, a detecting module, and a band-level recovery module.

The setting module is configured to set working resources that reside on a TE link in a network to a shared MESH recovery state, and flood information of the shared MESH recovery state into the network, in which the information of the shared MESH recovery state is used to broadcast that the failure recovery mode of the working resources of the TE link is a band-level shared MESH recovery mode, N band-level FA LSPs are established on the working resources of the TE link, and N band-level shared MESH recovery paths corresponding to the N band-level FA LSPs are established on recovery resources of other TE links aside from the TE link where the working resources reside in the network.

The detecting module is configured to detect whether the TE link where the working resources reside fails.

The band-level recovery module is configured to recover a service on the working resources of the TE link by switching the N band-level FA LSPs on the TE link to the corresponding N band-level shared MESH recovery paths when detecting that the TE link fails.

In a further aspect, in an embodiment, the present invention provides a system for recovering a service. The system includes a node apparatus and a network management device.

The node apparatus is configured to set working resources that reside on a TE link in a network to a shared MESH recovery state, and flood information of the shared MESH recovery state into the network, in which the information of the shared MESH recovery state is used to broadcast that the failure recovery mode of the working resources of the TE link is a band-level shared MESH recovery mode, wherein N band-level FA LSPs are established on the working resources of the TE link, and N band-level shared MESH recovery paths corresponding to the N band-level FA LSPs are established on recovery resources of other TE links aside from the TE link where the working resources reside in the network; detect whether the TE link fails; and recover services on the working resources of the TE link by switching the N segment-level FA LSPs on the TE link to the corresponding N band-level shared MESH recovery paths when detecting that the TE link fails.

The network management device is used to construct the N band-level FA LSPs by utilizing the working resources of the TE and construct the N band-level shared MESH recovery paths corresponding to the N band-level FA LSPs by utilizing the recovery resources of the TE link other than the TE link in the network.

By constructing the band-level shared MESH recovery paths corresponding to the band-level FA LSPs on the TE link, the technical solutions according to the embodiments switch the band-level FA LSPs on the TE link to the corresponding band-level shared MESH recovery paths when the TE link fails, so as to recover the services on the working resources of the failed TE link. Thus, the present invention can increase resource usage rate, greatly reduce the number of rerouting signaling packets, reduce service recovery time, and satisfy requirements for service recovery time from operators.

BRIEF DESCRIPTION OF THE DRAWINGS

To make the technical solution under the present invention clearer, the accompanying drawings for illustrating the embodiments of the present invention or the prior art are described below. Apparently, the accompanying drawings are for the exemplary purpose only, and person having ordinary skill in the art can derive other drawings from such accompanying drawings without any creative effort.

DETAILED DESCRIPTION

To make the technical solution, objectives and merits of the present invention clearer, the embodiments of the present invention are described in detail with reference to accompanying drawings. Apparently, the embodiments described below are for the exemplary purpose only, without covering all embodiments of the present invention. Person having ordinary skill in the art can derive other embodiments from the embodiments given herein without creative efforts, and all such embodiments are covered in the protection scope of the present invention.

First Embodiment

In the embodiment, the present invention provides a method for recovering a service, which includes the following steps:

Step 101: Set working resources that reside on a TE link in a network to a shared MESH recovery state, and information of the shared MESH recovery state is flooded into the network, in which the information of the shared MESH recovery state is used to broadcast that the failure recovery mode of the working resources of the TE link is a band-level shared MESH recovery mode, wherein N band-level FA LSPs are established on the working resources of the TE link, and N band-level shared MESH recovery paths corresponding to the N band-level FA LSPs are established on recovery resources of other TE links aside from the TE link where the working resources reside in the network. Here, N is an integer greater than or equal to 1.

Step 102: Detect whether the TE link where the network resources reside fails, and recover a service on the working resources of the TE link by switching the N band-level FA LSPs on the TE link to the corresponding N band-level shared MESH recovery paths when detecting that the TE link fails.

By constructing the band-level shared MESH recovery paths corresponding to the band-level FA LSPs on the TE link, the technical solution according to this embodiment switches the band-level FA LSPs on the TE link to the corresponding band-level shared MESH recovery paths when the TE link fails, so as to recover the service on the working resources of the TE link. Thus, the technical solution can increase resource usage rate, greatly reduce the number of rerouting signaling packets, reduce service recovery time, and satisfy requirements for service recovery time from operators.

Figure 1:
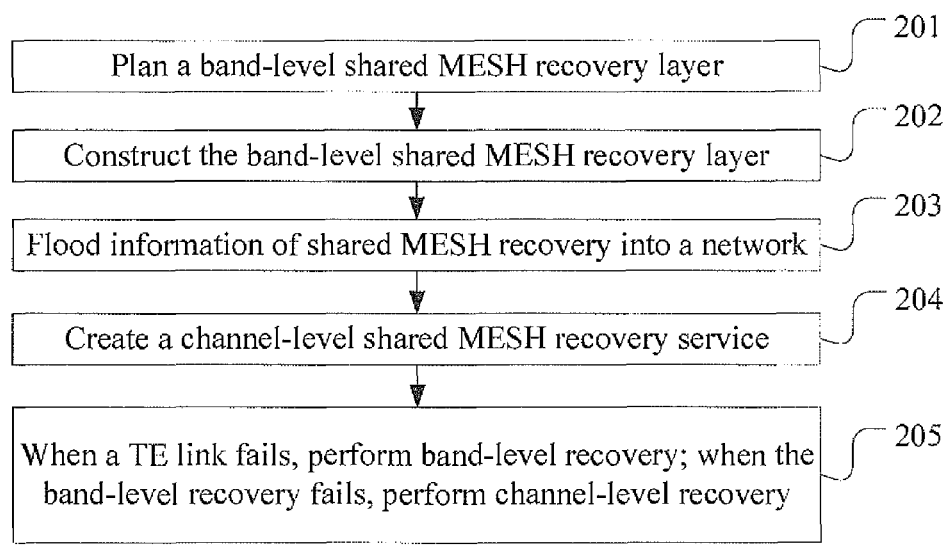
FIG. 1 is a flow chart of a method for recovering a service according to a first embodiment of the present invention.

To better understand this embodiment, this embodiment is described in detail in the following. As shown in FIG. 1, this embodiment includes the following steps:

Step 201: Plan a band-level shared MESH recovery layer over the TE links in the network by utilizing a planning tool or in a manual manner according to a traffic matrix of shared MESH recovery services in the network.

Specifically, by utilizing the traffic matrix of the shared MESH recovery services in the network, a working path of each service is planned. Resources on the TE link used by these working paths are referred to as working resources. Next, band-level FA LSPs are planned according to the working resources on each TE link, and then the band-level shared MESH recovery paths corresponding to the FA LSPs are planned. Resources used by the band-level shared MESH recovery paths are referred to as recovery resources. A set of the band-level FA LSP's and the band-level shared MESH recovery paths can be referred to as the band-level shared MESH recovery layer.

In this step, planning of the band-level shared MESH recovery layer can be completed by utilizing the planning tool, and a planning result is inputted to a network management device. Also, the planning of the band-level shared MESH recovery layer can be directly performed in the network management device in a manual manner.

Step 202: The network management device constructs the band-level shared MESH recovery layer.

Specifically, the network management device is used to create one or more band-level FA LSPs by utilizing the working resources of each TE link in the network, and establish one or more corresponding band-level shared MESH recovery paths by utilizing the recovery resources of other TE links aside from the TE link where the working resources reside in the network. The number of the band-level FA LSPs is the same as the number of routes of the band-level shared MESH recovery paths that used to protect the TE link, and the established shared MESH recovery paths are configured to an ingress node of the band-level FA LSPs, so as to create a band-level shared MESH recovery layer. Here, the band-level can be a waveband or a timeslot band.

Step 203: The ingress node of the band-level FA LSPs sets a protection/recovery state of a channel-level label of the working resources on each TE link as a "shared MESH recovery" state, and floods the "shared MESH recovery" state to each node in the network through the Open Shortest Path First (OSPF) protocol.

Specifically, one new "shared MESH recovery band" Sub-TLV can be extended in a Link TLV of a TE LSA message in the OSPF protocol, and a "shared MESH recovery band" state in this Sub-TLV is flooded to each node in the network through the OSPF protocol. The "shared MESH recovery band" denotes that a state of a timeslot or wavelength in Sub-TLV information is "shared MESH recovery" state.

An optional format of the "shared MESH recovery band" Sub-TLV is shown in Table 1. A value of Type denotes that a type of the Sub-TLV is the "shared MESH recovery band", and Length denotes the number of bytes of an object Value part. The Sub-TLV information includes an initial label of timeslot band and the number of timeslots included in the timeslot band. If the timeslot band is consecutive, for example from timeslot 1 to timeslot 12, a value of an initial label 1 is 1, and a value of label number 1 is 12. In the case of multiple nonconsecutive times lot bands, it is only needed to repeat for multiple times. For example, for timeslots from timeslot 1 to timeslot 5 and from timeslot 7 to timeslot 9, the value of the initial label 1 is 1, and the value of the label number 1 is 5; and the value of the initial label 2 is 7, and the value of the label number 2 is 3. In another solution, the Sub-TLV information can include an initial label of wavebands and the number of wavelengths included in the wavebands. If the wavelengths are consecutive, for example from wavelength 1 to wavelength 10, the value of the initial label is 1, and the value of the label number is 10. In the case of multiple nonconsecutive bands, it is only needed to repeat for multiple times. For example, for wavelengths from wavelength 1 to wavelength 4 and from wavelength 6 to wavelength 9, the value of the initial label 1 is 1, and the value of the label number 1 is 4; and the value of the initial label 2 is 6, and the value of the label number 2 is 4.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|                         Initial label 1                       |
+-+-+-+-+-+-+-+-+-+-+-+-+-+-+-+-+-+-+-+-+-+-+-+-+-+-+-+-+-+-+-+-+
|                          Label number 1                       |
+-+-+-+-+-+-+-+-+-+-+-+-+-+-+-+-+-+-+-+-+-+-+-+-+-+-+-+-+-+-+-+-+
|                         Initial label 2                       |
+-+-+-+-+-+-+-+-+-+-+-+-+-+-+-+-+-+-+-+-+-+-+-+-+-+-+-+-+-+-+-+-+
|                          Label number 2                       |
+-+-+-+-+-+-+-+-+-+-+-+-+-+-+-+-+-+-+-+-+-+-+-+-+-+-+-+-+-+-+-+-+
|                              ...                              |
+-+-+-+-+-+-+-+-+-+-+-+-+-+-+-+-+-+-+-+-+-+-+-+-+-+-+-+-+-+-+-+-+
```

Step 204: The network management device creates a channel-level shared MESH recovery service.

When utilizing a shortest path algorithm to calculate routes, the network management device adds a new routing constraint condition, that is, only TE links with idle channels in the "shared MESH recovery" state can be used. Further, when channel-level labels of the TE link are allocated at each node through which services pass, also only TE links with idle channels in the "shared MESH recovery" state can be used. That is, it is guaranteed that on a TE link through which paths of the established shared MESH recovery service pass, only idle channels in the "shared MESH recovery" state are used.

It is noted that, the channel-level can be a wavelength channel or a timeslot channel.

Step 205: The ingress node of the band-level FA LSPs detects whether the TE link fails, and when detecting that the TE link fails, by triggering a rerouting process, attempts to recover onto preset or reserved band-level shared MESH recovery paths in the band-level shared MESH recovery layer. If the band-level FA LSPs are recovered successfully, multiple channel-level services included therein are also recovered successfully. If the recovery fails, the ingress node of the segment-level FA LSPs notifies the failure to the ingress nodes of all channel-level services included therein through a Broadcast message immediately, so as to trigger channel-level rerouting recovery of the services.

Figure 2:
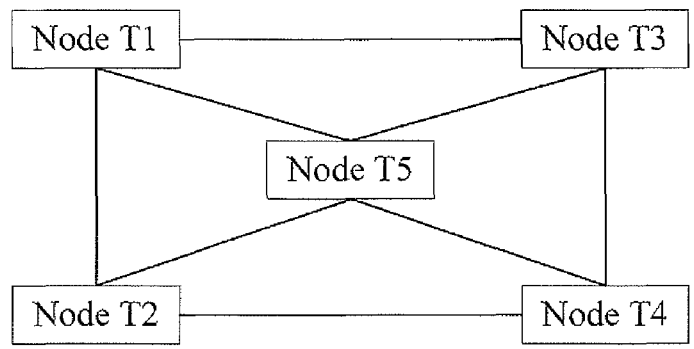
FIG. 2 is a schematic diagram of SDH networking of a method for recovering a service according to a first embodiment of the present invention.

Next, this embodiment is further described in detail by taking a 10G SDH network including 5 nodes as an example, and taking timeslot-band as an example of the band-level. For ease of description, the network includes no shared risk link group. As shown in FIG. 2, it is assumed that a traffic of 48 VC4 granularity services exists between a node T5 and nodes T1, T2, T3, and T4 respectively, that is, 192 VC4 granularity services in total; a traffic of 40 VC4 granularity services exists between the nodes T1 and T2, T2 and T3, T3 and T4, and T4 and T1 respectively, that is, 160 VC4 granularity services in total; the shared MESH recovery is needed to guarantee 100% recovery for single fiber broken.

Firstly, the band-level shared MESH recovery layer is planned.

According to the service traffic matrix, the following resource planning result is obtained by planning. Between the node T5 and the nodes T1, T2, T3, and T4, one 10G link is needed respectively. In 64 VC4 granularity timeslots of these links, 48 VC4 granularity timeslots are working resources, and 16 VC4 granularity timeslots are recovery resources. Between the nodes T1 and T2, T2 and T3, T3 and T4, and T4 and T1, one 10G link is also needed respectively. In 64 VC4 granularity timeslots of these links, 24 VC4 granularity timeslots are recovery resources, and the remaining 40 VC4 granularity timeslots are working resources. Network resource usage rate=working resources/(working resources+recovery resources)=352/(352+160)=68.75%.

Secondly, the network management device creates a shared MESH recovery layer of timeslot-bands of the VC4 granularity.

By taking a link of T1-T5 as an example, there are six timeslot-band shared MESH recovery paths for protecting this link of T1-T5 in total, which are T1-T3-T5, T1-T3-T4-T5, T1-T3-T4-T2-T5, T1-T2-T5, T1-T2-T4-T5, and T1-T2-T4-T3-T5 respectively. Hence, 6 VC4 timeslot-band FA LSPs are established on the link of T1-T5, each timeslot-band FA LSP corresponds to a timeslot-band shared MESH recovery path, and each times lot-band FA LSP includes 8 VC4 granularity timeslots. The VC4 granularity timeslots included in each timeslot-band FA LSP are not limited to the specific value, and may vary according to difference of the service number and/or network topology structure.

Thirdly, the ingress node of the timeslot-band FA LSPs sets the state of timeslots of working resources included in each timeslot-band FA LSP to the "shared MESH recovery" state, and floods the "shared MESH recovery" state information into the entire network through the OSPF protocol.

Specifically, the ingress node of the timeslot-band FA LSPs extends one new "shared MESH recovery band" Sub-TLV in the Link TLV of the TE LSA message in the OSPF protocol, and floods the "shared MESH recovery" state in this Sub-TLV to each node in the network through the OSPF protocol. The meaning of the "shared MESH recovery band" Sub-TLV, and how the "shared MESH recovery" state in the Sub-TLV is flooded into the network through the OSPF protocol are as described in Step 203, and are not recited here.

Fourthly, the network management device creates shared MESH recovery services of channel-level VC4 granularity.

48 LSPs of the shared MESH recovery services of the VC4 granularity are established on the link of T1-T5, that is, 48 LSPs of the shared MESH recovery services of the VC4 granularity are established on 6 timeslot-band FA LSPs in the link of T1-T5. For example, 8 LSPs of the shared MESH recovery services of the VC4 granularity can be established on each timeslot-band FA LSP, and service paths and timeslots are calculated by utilizing a routing algorithm, so as to judge whether a state of the calculated timeslots is the "shared MESH recovery" state. If yes, the timeslots in the "shared MESH recovery" state on the link of T1-T5 are used.

Fifthly, after the link of T1-T5 fails, the ingress node T1 of 6 timeslot-band FA LSPs on the link of T1-T5 triggers an FA LSP recovery process, and the services are switched to the timeslot-band shared MESH recovery paths.

Specifically, for one of the timeslot-band FA LSPs, at first, on the ingress node T1, 8 services passing through the timeslot-band FA LSPs are switched to the timeslot-band shared MESH recovery path, and then a signaling message is forwarded hop-by-hop along the nodes on the timeslot-band shared MESH recovery path. After the signaling message is received at a transit node, the node is cross-connected in terms of allocated timeslots of the timeslot-band shared MESH recovery path, and after reaching the egress node T5, the 8 services in the timeslot-band FA LSP are switched to the timeslot-band shared MESH recovery path. Processing of other timeslot-band FA LSPs is the same as that of the foregoing timeslot-band FA LSP, and is not described again here. At this time, it is only needed to simultaneously process 6 timeslot-band FA LSPs, which greatly reduces processing time compared with a channel-level recovery mechanism that simultaneously processes 48 timeslot granularity services, and when more services are to be processed, the effect is more obvious. If the recovery fails, the recovery of the channel-level services is triggered.

The technical solution according to this embodiment is not only applicable to the AEON, but also to a Generalized Multi-Protocol Label Switching network.

By constructing the band-level shared MESH recovery paths corresponding to the band-level FA LSPs on the TE link, the technical solution according to this embodiment switches the band-level FA LSPs on the TE link to the corresponding band-level shared MESH recovery paths when the TE link fails, to recover the services on the working resources of the TE link. Thus, the technical solution can increase the resource usage rate, greatly reduce the number of the rerouting signaling packets, reduce the service recovery time, and satisfy the requirements for the service recovery time from the operators.

Second Embodiment

Figure 3:
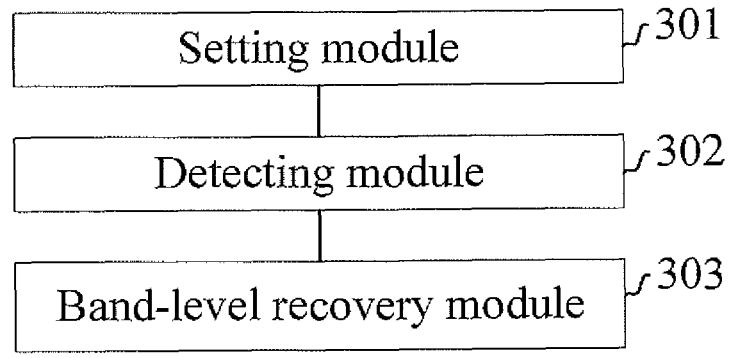
FIG. 3 is a schematic structural view of a node apparatus according to a second embodiment of the present invention.

In this embodiment, the present invention provides a node device. As shown in FIG. 3, the device includes a setting module 301, a detecting module 302, and a band-level recovery module 303.

The setting module 301 is configured to set working resources that reside on a TE link in a network to a shared MESH recovery state, and flood information of the shared MESH recovery state into the network, in which the information of the shared MESH recovery state is used to broadcast that the failure recovery mode of the working resources of the TE link is a band-level shared MESH recovery mode, N band-level FA LSPs are established on the working resources of the TE link, and N band-level shared MESH recovery paths corresponding to the N band-level FA LSPs are established on recovery resources of other TE links aside from the TE link where the working resources reside in the network. Here, N is an integer greater than or equal to 1.

The detecting module 302 is configured to detect whether the TE link fails.

The band-level recovery module 303 is configured to recover services on the working resources of the TE link by switching the N band-level FA LSPs on the TE link to the corresponding N band-level shared MESH recovery paths when detecting that the TE link fails.

Figure 4:
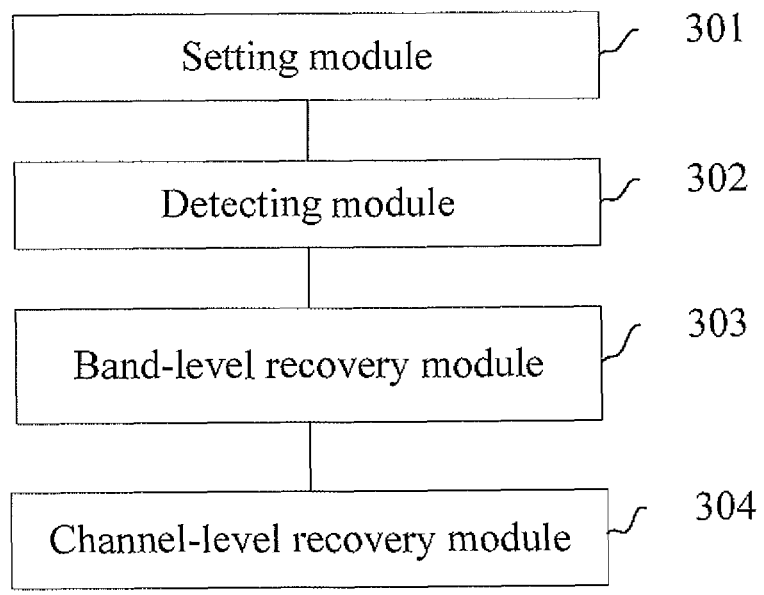
FIG. 4 is a schematic structural view of another node apparatus according to a second embodiment of the present invention.

Further, as shown in FIG. 4, the device further includes a channel-level recovery module 304.

The band-level recovery module 303 is further configured to broadcast the channel-level recovery module when the recovering of services on working resources of the TE link fails.

The channel-level recovery module 304 is configured to recover the service on the working resources of the TE link to a preset channel-level shared MESH recovery path according to the notification.

The band-level is a timeslot-band, the band-level shared MESH recovery paths are timeslot-band shared MESH recovery paths, and the information of the shared MESH recovery state includes an initial label of timeslot-band corresponding to the band-level FA LSPs and the number of timeslots included in the timeslot-band.

Or, the band-level is a waveband, the band-level shared MESH recovery paths are waveband shared MESH recovery paths, and the information of the shared MESH recovery state includes an initial label of wavebands corresponding to the band-level FA LSPs and the number of wavelengths included in the wavebands.

An implementing process of the node apparatus is as described in the method embodiment, and will not be recited here.

By constructing the band-level shared MESH recovery paths corresponding to the band-level FA LSPs on the TE link, the technical solution according to this embodiment switches the band-level FA LSPs on the TE link to the corresponding band-level shared MESH recovery paths when the TE link fails, so as to recover the services on the working resources of the failed TE link. Thus, the technical solution can increase resource usage rate, greatly reduce the number of rerouting signaling packets, reduce service recovery time, and satisfy requirements for service recovery time from operators.

Third Embodiment

Figure 5:
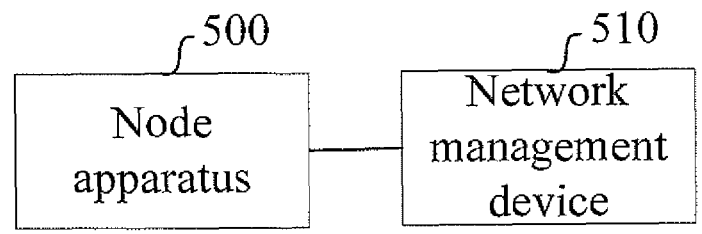
FIG. 5 is a schematic structural view of a system for recovering a service according to a third embodiment of the present invention.

In an embodiment, the present invention provides a system for recovering services, which includes a node apparatus 500 and a network management device 510, as shown in FIG. 5.

The node apparatus 500 is configured to set working resources that reside on a TE link in a network to a shared MESH recovery state, and flood information of the shared MESH recovery state into the network, in which the information of the shared MESH recovery state is used to broadcast that the failure recovery mode of the working resources of the TE link is a band-level shared MESH recovery mode, N band-level FA LSPs are established on the working resources of the TE link, and N band-level shared MESH recovery paths corresponding to the N band-level FA LSPs are established on recovery resources of other TE links aside from the above TE link in the network, where N is an integer greater than or equal to 1; detect whether the TE link fails; and recover services on the working resources of the TE link by switching the N band-level FA LSPs on the TE link to the corresponding N band-level shared MESH recovery paths when detecting that the TE link fails.

The network management device 510 is configured to construct the N band-level FA LSPs by utilizing the working resources of the TE link, and construct the N band-level shared MESH recovery paths corresponding to the N band-level FA LSPs by utilizing the recovery resources of the TE link other than the TE link in the network.

The node apparatus 500 is further configured to recover the services on the working resources of the TE link to a preset channel-level shared MESH recovery path when the band-level recovering of services on the working resources of the TE link fails.

The band-level is a timeslot-band, the band-level shared MESH recovery paths are timeslot-band shared MESH recovery paths, and the information of the shared MESH recovery state includes an initial label of timeslot-band corresponding to the band-level FA LSPs and the number of timeslots included in the timeslot-band.

Alternatively, the band-level is a waveband, the band-level shared MESH recovery paths are waveband shared MESH recovery paths, and the information of the shared MESH recovery state includes an initial label of wavebands corresponding to the band-level FA LSPs and the number of wavelengths included in the wavebands.

A specific implementing process of the node apparatus and the network management device are as described in the method embodiment, and will not be recited here.

By constructing the band-level shared MESH recovery paths corresponding to the band-level PA LSPs on the TE link, the technical solution according to this embodiment switches the band-level PA LSPs on the TE link to the corresponding band-level shared MESH recovery paths when the TE link fails, so as to recover the services on the working resources of the failed TE link. Thus, the technical solution can increase resource usage rate, greatly reduce the number of rerouting signaling packets, reduce service recovery time, and satisfy requirements for service recovery time from operators.

Persons of ordinary skill in the art may understand that all or part of the steps of the method according to the embodiments of the present invention may be implemented by a program instructing relevant hardware. The program may be stored in a computer readable storage medium, such as a floppy disk, a hard disk or a Compact Disk Read-Only Memory (CD-ROM).

The above descriptions are merely preferred embodiments of the present invention, but not intended to limit the scope of the present invention. Any modification, equivalent replacement, or improvement made without departing from the spirit and principle of the present invention should fall within the scope of the present invention.

What is claimed is:

1. A method for recovering a service, the method comprising:
    planning N band-level Forward Adjacency Label Switched Paths (FA LSPs) according to working resources of a TE link in a network, and planning N band-level shared MESH recovery paths corresponding to the N band-level FA LSPs; wherein the N is an integer greater than or equal to 1, and the N is the number of all band-level shared MESH recovery paths corresponding to the TE link;
    establishing the N band-level FA LSPs on the working resources of the TE link, and establishing the N band-level shared MESH recovery paths corresponding to the N band-level FA LSPs on recovery resources of the other TE links aside from the TE link in the network;
    flooding information of a shared MESH recovery state which indicates a state of working resources included in each of the N band-level FA LSPs into the network, wherein the information of the shared MESH recovery state is used to broadcast that a failure recovery mode of the working resources of the N band-level FA LSPs is a band-level shared MESH recovery mode; and
    detecting whether the TE link fails after the N band-level FA LSPs and the N band-level shared MESH recovery paths are established, and when detecting that the TE link fails, recovering a service on the working resources of the TE link by switching the N band-level FA LSPs on the TE link to the N band-level shared MESH recovery paths.

2. The method for recovering a service according to claim 1, wherein the band-level is a timeslot-band including a number of timeslots, the band-level shared MESH recovery paths are timeslot-band shared MESH recovery paths, and the information of the shared MESH recovery state comprises an initial label of timeslot-band corresponding to the band-level FA LSPs and the number of timeslots included in the timeslot-band.

3. The method for recovering a service according to claim 1, wherein the band-level is a waveband including a number of wavelengths, the band-level shared MESH recovery paths are waveband shared MESH recovery paths, and the information of the shared MESH recovery state comprises an initial label of wavebands corresponding to the band-level FA LSPs and the number of wavelengths included in the wavebands.

4. The method for recovering a service according to claim 1, further comprising:
    when the recovery of the service on the working resources of the TE link to the band-level shared MESH recovery paths fails, recovering the service on the working resources of the TE link to a preset channel-level shared MESH recovery path.

5. A system for recovering a service, the system comprising:
    a node apparatus and a network management device, wherein
    the network management device is configured to plan N band-level Forward Adjacency Label Switched Paths (FA LSPs) according to working resources of a TE link in a network, plan N band-level shared MESH recovery paths corresponding to the N band-level FA LSPs, establish the N band-level FA LSPs on the working resources of the TE, link, and establish the N band-level shared MESH recovery paths corresponding to the N band-level FA LSPs on recovery resources of the other TE, links aside from the TE link in the network; wherein the N is an integer greater than or equal to 1, and the N is the number of all band-level shared MESH recovery paths corresponding to the TE link;
    the node apparatus is configured to flood information of a shared MESH recovery state which indicates a state of working resources included in each of the N band-level FA LSPs into the network, detect whether the TE link fails after the N band-level FA LSPs and the N band-level shared MESH recovery paths are established; and recover a service on the working resources of the TE, link by switching the N band-level FA LSPs on the TE link to the N band-level shared MESH recovery paths when detecting that the TE link fails; wherein the information of the shared MESH recovery state is used to broadcast that a failure recovery mode of the working resources of the N band-level FA LSPs is a band-level shared MESH recovery mode.

6. The system for recovering services according to claim 5, wherein the node apparatus is further configured to recover the services on the working resources of the TE link to the preset channel-level shared MESH recovery paths when the band-level recovery of the services on the working resources of the TE link fails.

7. The system for recovering services according to claim 5, wherein
the band-level is a timeslot-band including a number of timeslots, the band-level shared MESH recovery paths are timeslot-band shared MESH recovery paths, and the information of the shared MESH recovery state comprises an initial label of timeslot-bands corresponding to the band-level FA LSPs and the number of timeslots included in the timeslot-bands.

8. The system for recovering services according to claim 5, wherein
the band-level is a waveband including a number of wavelengths, the band-level shared MESH recovery paths are waveband shared MESH recovery paths, and the information of the shared MESH recovery state comprises an initial label of wavebands corresponding to the band-level FA LSPs and the number of wavelengths included in the wavebands.

* * * * *